United States Patent [19]
Walther et al.

[11] 3,879,556
[45] Apr. 22, 1975

[54] PHARMACEUTICAL COMPOSITIONS CONTAINING A 1,2,3,6-TETRAHYDRO-4-PYRIDYLMETHYL CARBOXYLATE AND METHOD OF USE

[75] Inventors: Gerhard Walther, Ingelheim am Rhein; Rudolf Bauer, Wiesbaden; Hans Hugo Hübner; Rolf Banholzer, both of Ingelheim am Rhein, Germany

[73] Assignee: Boehringer Ingelheim G.m.b.H., Ingelheim am Rhein, Germany

[22] Filed: Nov. 27, 1973

[21] Appl. No.: 419,401

Related U.S. Application Data
[62] Division of Ser. No. 176,708, Aug. 31, 1971, Pat. No. 3,786,059.

[30] Foreign Application Priority Data
Sept. 2, 1970  Germany............... 2043455

[52] U.S. Cl. ............................................. 424/263
[51] Int. Cl. ............................................. A61k 27/00
[58] Field of Search .............................. 424/263

[56] References Cited
FOREIGN PATENTS OR APPLICATIONS
735,141  12/1969  Belgium................ 424/263

*Primary Examiner*—Frederick E. Waddell
*Attorney, Agent, or Firm*—Hammond & Littell

[57] ABSTRACT

Anticholinergic pharmaceutical compositions containing as the active ingredient a racemic mixture of a compound of the formula

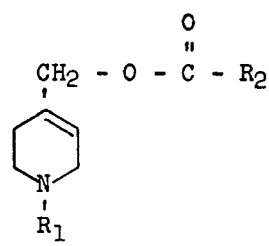

wherein
$R_1$ is hydrogen, alkyl of one to eight carbon atoms, chloro(alkyl of one to eight carbon atoms), cyano-(alkyl of one to eight carbon atoms), hydroxy-(alkyl of one to eight carbon atoms), phenyl-(alkyl of one to eight carbon atoms), alkenyl of three to four carbon atoms or alkynyl of three to four carbon atoms, and $R_2$ is

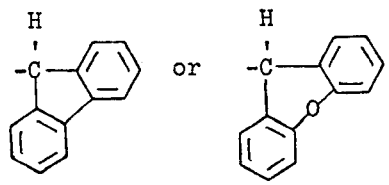

where
$R_3$ is hydroxyl or, together with $R_4$ and the carbon atom to which they are attached, a five- to six-membered saturated carbocyclic ring,
$R_4$ and $R_5$ are each alkyl of one to four carbon atoms, cycloalkyl of five to six carbon atoms or phenyl, and
$R_6$ is cycloalkyl of five to six carbon atoms or phenyl, an optically active antipode thereof, a quaternary ammonium salt thereof, or a non-toxic acid addition salt of said racemate or optically active antipode; and a method of blocking the passage of impulses through the parasympathetic nerves therewith.

8 Claims, No Drawings

PHARMACEUTICAL COMPOSITIONS CONTAINING A 1,2,3,6-TETRAHYDRO-4-PYRIDYLMETHYL CARBOXYLATE AND METHOD OF USE

This is a division of copending application Ser. No. 176,708, filed Aug. 31, 1971, now U.S. Pat. No. 3,786,059 issued Jan. 15, 1974.

This invention relates to novel anticholinergic pharmaceutical compositions containing a 1,2,3,6-tetrahydro-4-pyridylmethyl carboxylate, an acid addition salt thereof or a quaternary salt thereof, as well as to a method of using the same.

More particularly, the present invention relates to novel pharmaceutical compositions containing as an anticholinergic ingredient a racemic or optically active compound of the formula

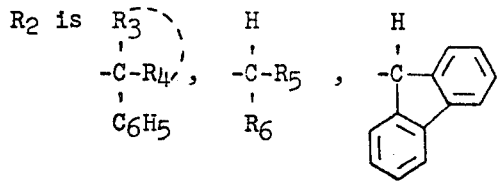
(I)

wherein $R_1$ is hydrogen, alkyl of one to eight carbon atoms, chloro-(alkyl of one to eight carbon atoms), cyano-(alkyl of one to eight carbon atoms), hydroxy-(alkyl of one to eight carbon atoms), phenyl-(alkyl of one to eight carbon atoms), alkenyl of three to four carbon atoms or alkynyl of three to four carbon atoms, and $R_2$ is

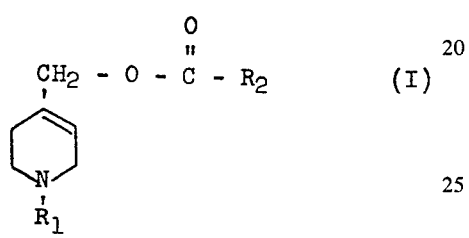

where $R_3$ is hydroxyl or, together with $R_4$ and the carbon atom to which they are attached, a five- to six-membered saturated carbocyclic ring, $R_4$ and $R_5$ are each alkyl of one to four carbon atoms, cycloalkyl of five to six carbon atoms or phenyl, and $R_6$ is cycloalkyl of five to six carbon atoms or phenyl, a non-toxic, pharmacologically acceptable acid addition salt thereof or a quaternary salt thereof.

The compounds embraced by formula I above may be prepared by a number of different methods involving well known chemical synthesis principles, among which the following have proved to be most convenient and efficient.

Method A

By esterifying a 1,2,3,6-tetrahydro-4-pyridylmethyl compound of the formula

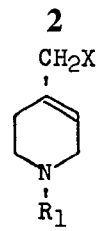
(II)

wherein X is hydroxyl or halogen, and $R_1$ has the same meanings as in formula I, but is preferably alkyl of one to eight carbon atoms, cyano-(alkyl of one to eight carbon atoms), phenyl-(alkyl of one to eight carbon atoms) or alkenyl of three to four carbon atoms, or an acid addition salt thereof, with a compound of the formula

(III)

wherein $R_2$ has the same meanings as in formula I, and Y is acyl only, preferably carboxylic acid only, N-imidazolyl, halogen, hydroxyl or -ONa.

Method B

By reacting a 1,2,3,6-tetrahydro-4-pyridylmethylcarbinol of the formula

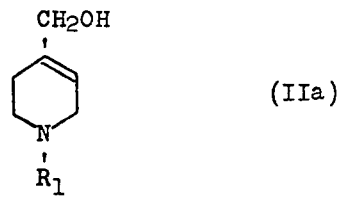
(IIa)

wherein $R_1$ has the same meanings as in formula I, but is preferably alkyl of one to eight carbon atoms, phenyl-(alkyl of one to eight carbon atoms) or alkenyl of three to four carbon atoms, with a lower alkyl carboxylate of the formula

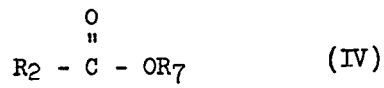
(IV)

wherein $R_2$ has the same meanings as in formula I, and $R_7$ is lower alkyl, in the presence of a basic catalyst, such as an alkali metal alcoholate.

Method C

By alkylating a 1,2,3,6-tetrahydro-4-pyridylmethyl carboxylate of the formula

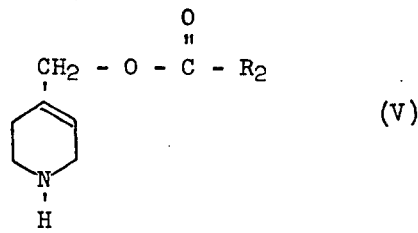
(V)

wherein $R_2$ has the same meanings as in formula I, with an alkyl halide of the formula

R₁X     (VI)

wherein X is halogen, and
R₁ has the same meanings as in formula I,
pursuant to conventional methods, or with a corresponding aldehyde in the presence of formic acid.

Method D

For the preparation of a compound of the formula I wherein R₁ is chloroalkyl, by reacting an N-hydroxyalkyl-1,2,3,6-tetrahydro-4-pyridylmethyl carboxylate of the formula

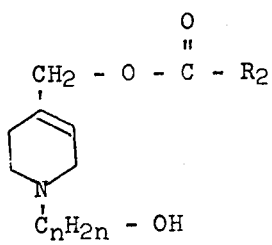

(VII)

wherein R₂ has the same meanings as in formula I, and
n is an integer from 2 to 8, inclusive,
with a chlorinating agent, such as thionyl chloride.

The compounds of the formula I above are organic bases and therefore form acid addition salts with inorganic or organic acids. Examples of non-toxic, pharmacologically acceptable acid addition salts are those formed with a hydrohalic acid, sulfuric acid, methanesulfonic acid, acetic acid, tartaric acid, citric acid, maleic acid, 8-chlorotheophyl-line or the like.

Likewise, a tertiary tetrahydro-pyridylmethyl carboxylate of the formula I may be converted into the corresponding quaternary tetrahydro-pyridinium salt by reaction with a conventional quaternizing agent, such as an alkyl halide, an alkyl sulfate or an alkyl methanesulfonate.

The compounds embraced by formula I may occur as racemic mixtures from which the optically active antipode components may be isolated by conventional fractional precipitation procedures with the aid of an optically active acid, such as L(+)— and/or D(-)-tartaric acid. However, the optically active antipodes may also be obtained directly by using the corresponding optically active starting compounds in methods A to D above.

The majority of the starting compounds for methods A to D are known compounds, and those which have heretofore not been specifically described in the prior art may be prepared by known processes.

For instance, a starting compound of the formula IIa may be prepared by reducing a pyridinium carbinol of the formula

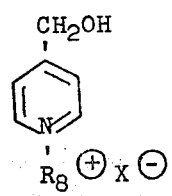

(VIII)

wherein R₈ is alkyl or substituted alkyl, and
X is halogen, for example, bromine and iodine with sodium borohydride.

Esterification of a compound of the formula IIa and removal of substituent R₁, such as by de-alkylation with phosgene by way of the corresponding carbonyl compound, yields a starting compound of the formula V.

The following examples illustrate the preparation of starting compounds of the formula IIa as well as end products of the formula I. Preparation of starting compounds of the formula IIa.

EXAMPLE A

1-Methyl -1,2,3,6-tetrahydro-4-pyridyl-carbinol

A solution of 22.8 gm (0.6 mol) of sodium borohydride in 50 ml of 0.1 N sodium hydroxide was added dropwise over a period of 1 hour to a solution of 102 gm (0.5 mol) of 1-methyl-4-hydroxymethyl-pyridinium bromide in 600 ml of methanol at -5° to 0°C, accompanied by stirring. Thereafter, the reaction solution was stirred for 1 hour more at 0°C and was then substantially evaporated in vacuo on a water bath at 60°C. The residue was admixed with aqueous 40% potassium carbonate, and the mixture was extracted several times with ether. The combined ether extract solutions were dried over sodium sulfate and then evaporated, and the residual raw product was fractionally distilled in vacuo, yielding 45.1 gm (71% of theory) of the compound of the formula

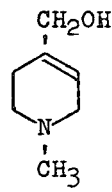

having a boiling point of 86°–88°C at 0.2 mm Hg.

43.7 gm of the base were dissolved in ethyl acetate and, while exteriorly cooling the solution with ice, gaseous hydrogen chloride was passed therethrough. The crystalline precipitate formed thereby was collected by vacuum filtration and recrystallized from ethanol, yielding 51.8 gm (92% of theory) of the hydrochloride, m.p. 152°–154°C.

EXAMPLE B

Using a procedure analogous to that described in Example A, 1-ethyl-1,2,3,6-tetrahydro-4-pyridyl-carbinol, b.p. 129°–132°C at 14 mm Hg, was prepared from 1-ethyl-4-hydroxymethyl-pyridinium bromide. Its hydrochloride had a melting point of 136°–138°C (recrystallized from ethanol).

EXAMPLE C

Using a procedure analogous to that described in Example A, 1-n-propyl-1,2,3,6-tetrahydro-4-pyridyl-carbinol, b.p. 139°–142°C at 17 mm Hg, was prepared from 1-n-propyl-4-hydroxymethyl-pyridinium bromide. Its hydrochloride had a melting point of 165-167°C (recrystallized from ethanol).

EXAMPLE D

Using a procedure analogous to that described in Example A, 1-isopropyl-1,2,3,6-tetrahydro-4-pyridyl-carbinol, b.p. 137°–139°C at 17 mm Hg, was prepared from 1-isopropyl-4-hydroxymethyl-pyridinium bromide. Its hydrochloride had a melting point of 170°–171°C (recrystallized from ethanol/ether).

EXAMPLE E

Using a procedure analogous to that described in Example A, 1-n-butyl-1,2,3,6-tetrahydro-4-pyridyl-carbinol, b.p. 146°–149°C at 17 mm Hg, was prepared from 1-n-butyl -4-hydroxymethyl)-pyridinium bromide. Its hydrochloride had a melting point of 153°–156°C (recrystallized from acetonitrile).

EXAMPLE F

Using a procedure analogous to that described in Example A, 1-n-pentyl-1,2,3,6-tetrahydro-4-pyridyl-carbinol, b.p. 159°–163°C at 17 mm Hg, was prepared from 1-n-pentyl-4-hydroxymethyl-pyridinium bromide. Its hydrochloride had a melting point of 150°–151°C (recrystallized from acetonitrile/acetone).

EXAMPLE G

Using a procedure analogous to that described in Example A, 1-n-hexyl-1,2,3,6-tetrahydro-4-pyridyl-carbinol, b.p. 169°–173°C at 17 mm Hg, was prepared from 1-n-hexyl-4-hydroxymethyl-pyridinium bromide. Its hydrochloride had a melting point of 131.5°–134°C (recrystallized from acetonitrile).

EXAMPLE H

Using a procedure analogous to that described in Example A, 1-allyl-1,2,3,6-tetrahydro-4-pyridyl-carbinol, b.p. 143°–145°C at 17 mm Hg, was prepared from 1-allyl-4-hydroxymethyl-pyridinium bromide. Its hydrochloride had a melting point of 124°–126°C.

EXAMPLE I

Using a procedure analogous to that described in Example A, 1-(β-phenethyl)-1,2,3,6-tetrahydro-4-pyridyl-carbinol, m.p. 69.5°–71°C (recrystallized from acetone/gasoline), was prepared from 1-(β-phenethyl)-4-hydroxymethyl-pyridinium bromide.
Preparation of end products of the formula I.

EXAMPLE 1

1-Methyl-1,2,3,6-tetrahydro-4-pyridylmethyl α-phenyl-cyclopentylacetate, its methanesulfonate and its hydrochloride by method A A mixture consisting of 163.65 gm (1 mol) of 1-methyl-1,2,3,6-tetrahydro-4-pyridyl-carbinol hydrochloride, 234 gm (1.05 mol) of α-phenyl-cyclopentylacetic acid chloride and 400 ml of absolute pyridine was refluxed for 3 hours. Thereafter, the pyridine was distilled off in vacuo, the residue was taken up in 2 N hydrochloric acid, and the resulting acidic solution was extracted twice with 200 ml of ether each. The ether extracts were discarded, and the acid aqueous phase was made alkaline with concentrated ammonia and extracted twice with 500 ml of ether each. The combined ethereal extract solutions were dried over anhydrous sodium sulfate and then evaporated, leaving as the residue 299 gm (95% of theory) of the raw 1-methyl-1,2,3,6-tetrahydro-4-pyridylmethyl ester of α-phenyl-cyclopentylacetic acid.

The raw base was dissolved in 1,500 ml of ether, and 96 gm of methanesulfonic acid were added dropwise to the solution, while stirring. The crystalline precipitate formed thereby was collected by vacuum filtration and recrystallized several times from acetone, yielding 305 gm (74.6% of theory) of the compound of the formula

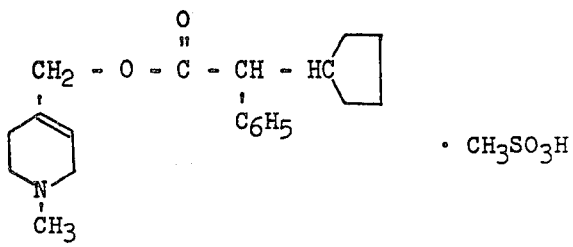

having a melting point of 123°–130°C.
The hydrochloride had a melting point of 153°–155°C (recrystallized from acetone).

EXAMPLE 2

1-Methyl-1,2,3,6-tetrahydro-4-pyridylmethyl-α-phenyl-cyclopentylacetate and its methanesulfonate by method B 25.43 gm (0.2 mol) of 1-methyl-1,2,3,6-tetrahydro-4-pyridyl-carbinol and 52.4 gm (0.24 mol) of methyl α-phenyl-cyclopentylacetate (b.p. 156°–159°C at 17 mm Hg; $n_D^{24} = 1.5129$) were dissolved in 120 ml of absolute n-heptane, 1 gm of sodium methylate was added to the solution, and the mixture was refluxed for 3 hours while simultaneously continuously withdrawing the methanol released by the ester exchange reaction with the aid of a water separator. Thereafter, the reaction mixture was extracted first several times with water and then twice with 150 ml of aqueous 50% acetic acid each. The combined acetic acid extracts were made alkaline with concentrated ammonia while exteriorly cooling with ice, and the base liberated thereby was extracted with n-heptane. The heptane extract solution was thoroughly dried over anhydrous sodium sulfate and then evaporated in vacuo at 60°C, leaving as a residue 53.5 gm (85.4% of theory) of a light yellow oil, which was identified to be the 1-methyl-1,2,3,6-tetrahydro-4-pyridylmethyl ester of α-phenyl-cyclopentylacetic acid.

The free base was converted into its methanesulfonate, m.p. 128°–130°C, which was identical to the methanesulfonate obtained in Example 1.

EXAMPLE 3

Using a procedure analogous to that described in Example 2, 1-methyl-1,2,3,6-tetrahydro-4-pyridylmethyl α-phenyl-β-methyl-butyrate hydrochloride, m.p. 182°–185°C (recrystallized from acetonitrile), of the formula

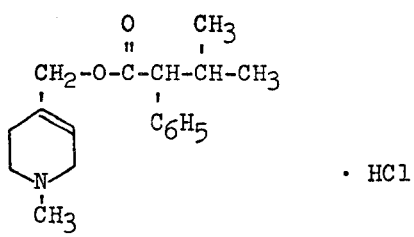

was prepared from 1-methyl-1,2,3,6-tetrahydro-4-pyridylcarbinol and methyl α-phenyl-β-methyl-butyrate.

EXAMPLE 4

1-Methyl-1,2,3,6-tetrahydro-4-pyridylmenthyl α-phenylcyclohexylacetate and its methanesulfonate by method A A mixture consisting of 88.2 gm (0.54 mol) of 1-methyl-1,2,3,6-tetrahydro-4-pyridyl-carbinol hydrochloride, 128 gm (0.54 mol) of α-phenyl-cyclohexylacetic acid chloride and 500 ml of absolute pyridine was refluxed for 3 hours. Thereafter, the reaction solution was evaporated in vacuo, the residue was taken up in aqueous 20% hydrochloric acid, and the acid solution was extracted with 300 ml of ether. The acidic aqueous phase was made alkaline with concentrated ammonia, and the base liberated thereby was separated by extracting the mixture three times with 300 ml of ether each. The combined ethereal extracts were dried over anhydrous sodium sulfate and then evaporated in vacuo, leaving as a residue 160.5 gm (90.7% of theory) of a light yellow oil, which was identified to be the raw 1-methyl-1,2,3,6-tetrahydro-4-pyridylmethyl ester of α-phenyl-cyclohexyl-acetic acid.

The free base was dissolved in ether, the solution was admixed with a slight excess of methanesulfonic acid, and the precipitate formed thereby was collected and recrystallized from ethylacetate, yielding the methanesulfonate of the formula

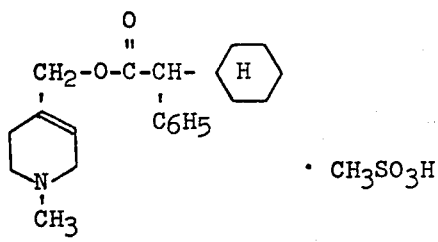

having a melting point of 127°–129°C.

EXAMPLE 5

Using a procedure analogous to that described in Example 4, 1-methyl-1,2,3,6-tetrahydro-4-pyridylmethyl 1-phenyl-cyclopentanecarboxylate and its hydrochloride, m.p. 154°–155°C (recrystallized from acetonitrile/ether), of the formula

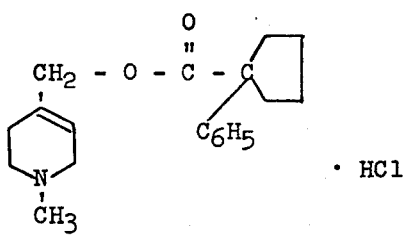

were prepared from 1-methyl-1,2,3,6-tetrahydro-4-pyridylcarbinol hydrochloride and 1-phenyl-cyclopentanecarboxylic acid chloride.

EXAMPLE 6

Using a procedure analogous to that described in Example 4, 1-methyl-1,2,3,6-tetrahydro-4-pyridylmethyl diphenylacetate and its hydrochloride, m.p. 142°–143°C (recrystallized from acetonitrile/ether), of the formula

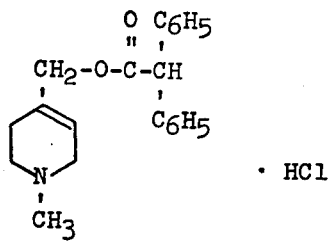

were prepared from 1-methyl-1,2,3,6-tetrahydro-4-pyridylcarbinol hydrochloride and diphenylacetic acid chloride.

EXAMPLE 7

Using a procedure analogous to that described in Example 4, 1-methyl-1,2,3,6-tetrahydro-4-pyridylmethyl xanthene-9-carboxylate and its methanesulfonate, m.p. 150°–152°C (recrystallized from butanone), of the formula

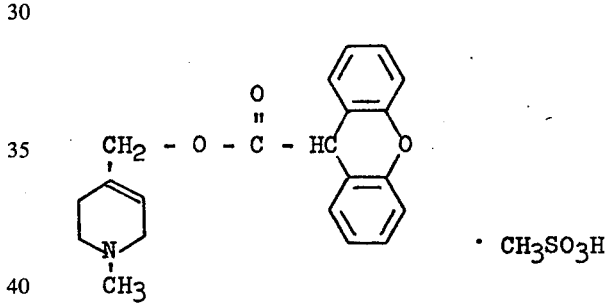

were prepared from 1-methyl-1,2,3,6-tetrahydro-4-pyridylcarbinol hydrochloride and xanthene-9-carboxylic acid chloride.

EXAMPLE 8

Using a procedure analogous to that described in Example 4, 1-methyl-1,2,3,6-tetrahydro-4-pyridylmethyl α-phenyl-γ-methyl-valerate and its hydrochloride, m.p. 125°–127°C (recrystallized from ethyl acetate), of the formula

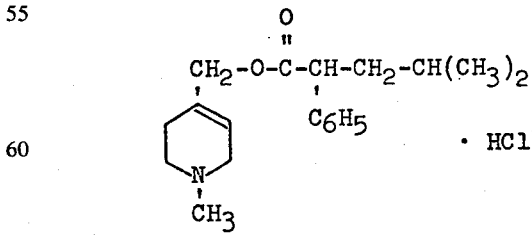

were prepared from 1-methyl-1,2,3,6-tetrahydro-4-pyridylcarbinol hydrochloride and α-phenyl-γ-methyl-valeric acid chloride.

EXAMPLE 9

Using a procedure analogous to that described in Example 4, 1-methyl-1,2,3,6-tetrahydro-4-pyridylmethyl dicyclopentylacetate and its hydrochloride, m.p. 147°–148°C (recrystallized from acetone/ether), of the formula

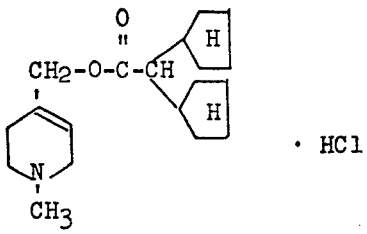

· HCl were prepared from 1-methyl-1,2,3,6-tetrahydro-4-pyridylcarbinol hydrochloride and dicyclopentylacetic acid chloride.

EXAMPLE 10

Using a procedure analogous to that described in Example 4, 1-methyl-1,2,3,6-tetrahydro-4-pyridylmethyl α-n-butyl-cyclopentylacetate and its tartrate, m.p. 103°–106°C (recrystallized from acetonitrile), of the formula

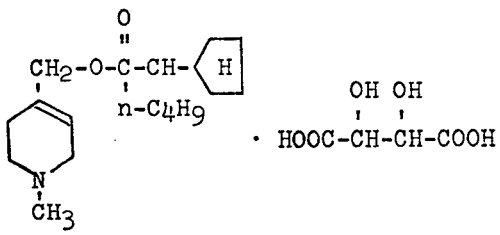

· HOOC-CH(OH)-CH(OH)-COOH were prepared from 1-methyl-1,2,3,6-tetrahydro-4-pyridylcarbinol hydrochloride and α-n-butyl-cyclopentylacetic acid chloride.

EXAMPLE 11

Using a procedure analogous to that described in Example 4, 1-methyl-1,2,3,6-tetrahydro-4-pyridylmethyl α-phenyl-butyrate and its citrate, m.p. 122°–124°C (recrystallized from isopropanol), of the formula

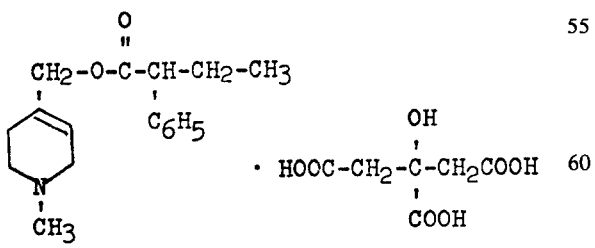

· HOOC-CH₂-C(OH)(COOH)-CH₂COOH were prepared from 1-methyl-1,2,3,6-tetrahydro-4-pyridylcarbinol hydrochloride and α-phenyl-butyric acid chloride.

EXAMPLE 12

Using a procedure analogous to that described in Example 4, 1-isopropyl-1,2,3,6-tetrahydro-4-pyridylmethyl α-phenyl-cyclopentylacetate and its hydrochloride, m.p. 143°–145°C (recrystallized from ethylacetate), of the formula

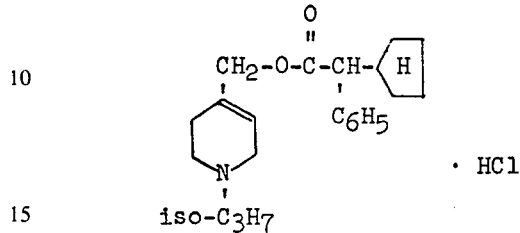

· HCl were prepared from 1-isopropyl-1,2,3,6-tetrahydro-4-pyridylcarbinol hydrochloride and α-phenyl-cyclopentylacetic acid chloride.

EXAMPLE 13

1-Methyl-1,2,3,6-tetrahydro-4-pyridylmethyl α-phenyl-cyclopentylacetate methobromide A mixture consisting of 15.7 gm (0.05 mol) of 1-methyl-1,2,3,6-tetrahydro-4-pyridylmethyl α-phenyl-cyclopentylacetate, 7.13 gm (0.075 mol) of methyl bromide and 50 ml of acetonitrile was stirred for 4 hours at room temperature. Thereafter, the crystalline precipitate formed thereby was collected by vacuum filtration and repeatedly recrystallized from acetonitrile until it had a constant melting point. 15.3 gm (75% of theory) of the quaternary salt, m.p. 185°–187°C, of the formula

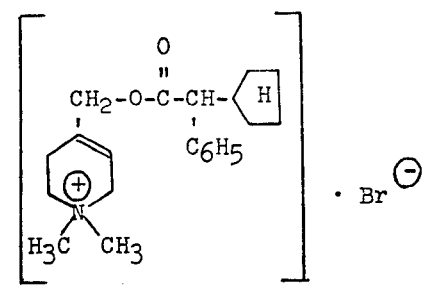

· Br⁻ were obtained.

EXAMPLE 14

Using a procedure analogous to that described in Example 13, 1-methyl-1,2,3,6-tetrahydro-4-pyridylmethyl α-cyclopentyl-phenylglycolate methobromide, m.p. 200°–203°C (recrystallized from acetonitrile), of the formula

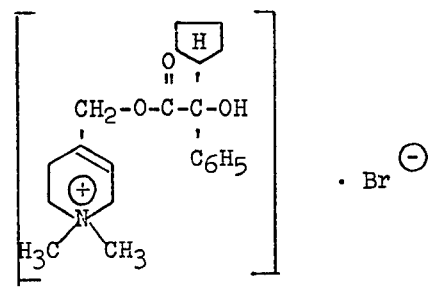

· Br⁻ was prepared from 1-methyl-1,2,3,6-tetrahydro-4-pyridylmethyl α-cyclopentyl-phenylglycolate and methyl bromide.

EXAMPLE 15

Using a procedure analogous to that described in Example 13, 1-ethyl-1,2,3,6-tetrahydro-4-pyridylmethyl benzilate methobromide, m.p. 145°–147°C (recrystallized from acetonitrile), of the formula

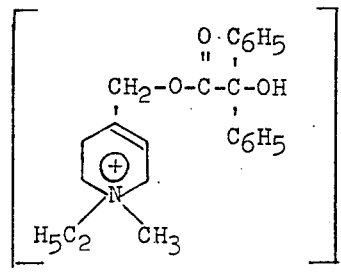

was prepared from 1-ethyl-1,2,3,6-tetrahydro-4-pyridylmethyl benzilate and methyl bromide.

EXAMPLE 16

Using a procedure analogous to that described in Example 13, 1-allyl-1,2,3,6-tetrahydro-4-pyridylmethyl benzilate methobromide, m.p. 153°–155°C (recrystallized from acetonitrile), of the formula

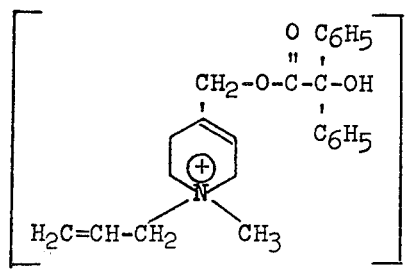

was prepared from 1-allyl-1,2,3,6-tetrahydro-4-pyridylmethyl benzilate and methyl bromide.

EXAMPLE 17

Using a procedure analogous to that described in Example 13, 1-methyl-1,2,3,6-tetrahydro-4-pyridylmethyl 1phenyl-cyclopentanecarboxylate methobromide, m.p. 184°–186°C (recrystallized from acetonitrile), of the formula

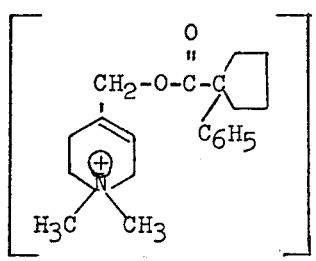

was prepared from 1-methyl-1,2,3,6-tetrahydro-4-pyridylmethyl 1-phenyl-cyclopentanecarboxylate and methyl bromide.

EXAMPLE 18

Using a procedure analogous to that described in Example 13, 1-ethyl-1,2,3,6-tetrahydro-4-pyridylmethyl hexahydrobenzilate methobromide, m.p. 177°–179°C (recrystallized from acetonitrile/ether), of the formula

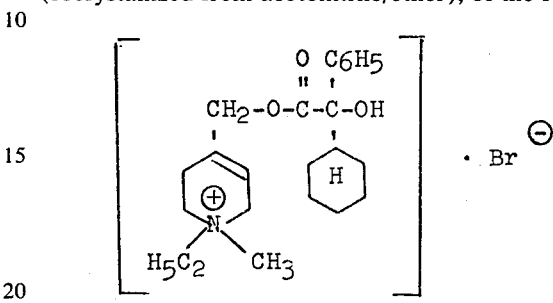

was prepared from 1-ethyl-1,2,3,6-tetrahydro-4-pyridylmethyl hexahydrobenzilate and methyl bromide.

EXAMPLE 19 using a procedure analogous to that described in Example 13, 1-methyl-1,2,3,6-tetrahydro-4-pyridylmethyl dicyclopentylacetate methobromide, m.p. 216°–218°C (recrystallized from acetonitrile), of the formula

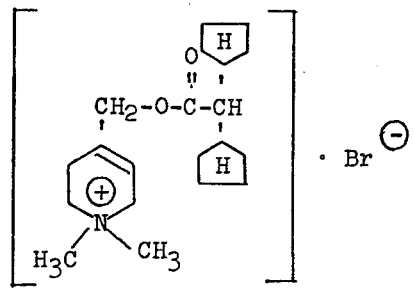

was prepared from 1-methyl-1,2,3,6-tetrahydro-4-pyridylmethyl dicyclopentylacetate and methyl bromide.

EXAMPLE 20

Using a procedure analogous to that described in Example 13, 1-isopropyl-1,2,3,6-tetrahydro-4-pyridylmethyl benzilate methobromide, m.p. 146°–148°C (recrystallized from acetonitrile/ethylacetate), of the formula

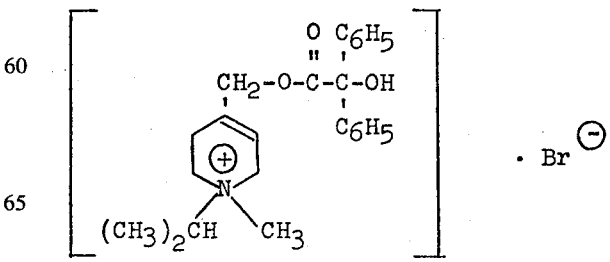

was prepared from 1-isopropyl-1,2,3,6-tetrahydro-4-pyridylmethyl benzilate and methyl bromide.

EXAMPLE 21

1-Methyl-1,2,3,6-tetrahydro-4-pyridylmethyl α-phenyl-cyclohexylacetate methobromide A mixture consisting of 16.37 gm (0.05 mol) of 1-methyl-1,2,3,6-tetrahydro-4-pyridylmethyl α-phenyl-cyclohexylacetate, 7.13 gm (0.075 mol) of methyl bromide and 250 ml of acetone was stirred at room temperature for 3 hours. Thereafter, the crystalline precipitate which had formed was collected by vacuum filtration and recrystallized from ethanol/ether in the presence of activated charcoal, yielding 16.8 gm (79.6% of theory) of the quaternary compound, m.p. 200°–202°C, of the formula

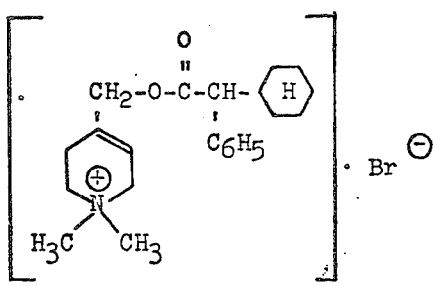

EXAMPLE 22

1-Ethyl-1,2,3,6-tetrahydro-4-pyridylmethyl benzilate and its hydrochloride by method B 26.7 gm (0.11 mol) of methyl benzilate and 100 mgm of sodium methylate were added to a solution of 14.1 gm (0.1 mol) of 1-ethyl-1,2,3,6-tetrahydro-4-pyridylcarbinol in 100 ml of absolute n-heptane, and the mixture was heated at its boiling point for 3 hours, accompanied by stirring, while simultaneously and continuously withdrawing the methanol released by the esterification reaction with the aid of a water separator. Thereafter, the hot reaction mixture was filtered through activated charcoal to remove insoluble components, the filtrate was allowed to cool, and the crystalline precipitate formed thereby was re-dissolved by addition of ether. The resulting solution was extracted with dilute hydrochloric acid, the acid aqueous phase was made alkaline with concentrated ammonia while exteriorly cooling with ice, and the alkaline mixture was extracted with ether. The ethereal extracts were dried over anhydrous sodium sulfate and then evaporated in vacuo, and the residue was recrystallized from acetone, yielding 21 gm (59.8% of theory) of the compound of the formula

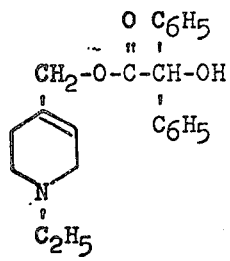

having a melting point of 109-111°C.

Its hydrochloride has a melting point of 187°–188°C (recrystallized from acetonitrile/methanol).

EXAMPLE 23

Using a procedure analogous to that described in Example 22, 1-methyl-1,2,3,6-tetrahydro-4-pyridylmethyl α-cyclopentyl-phenylglycolate and its hydrochloride, m.p. 145°–147°C (recrystallized from acetone), of the formula

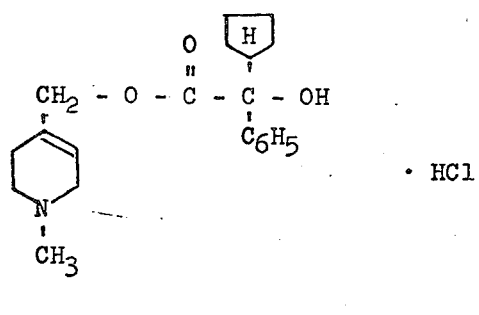

were prepared from 1-methyl-1,2,3,6-tetrahydro-4-pyridylcarbinol and methyl α-cyclopentyl-phenylglycolate.

EXAMPLE 24

Using a procedure analogous to that described in Example 22, 1-n-propyl-1,2,3,6-tetrahydro-4-pyridylmethyl benzilate and its hydrochloride, m.p. 187°–189°C (recrystallized from ethanol), of the formula

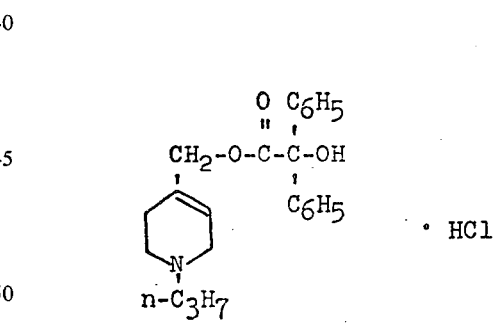

were prepared from 1-n-propyl-1,2,3,6-tetrahydro-4-pyridylcarbinol and methyl benzilate.

EXAMPLE 25

Using a procedure analogous to that described in Example 22, 1-isopropyl-1,2,3,6-tetrahydro-4-pyridylmethyl benzilate and its hydrochloride, m.p. 155°–157°C (recrystallized from acetonitrile/ether), were prepared from 1-isopropyl-1,2,3,6-tetrahydro-4-pyridyl-carbinol and methyl benzilate.

EXAMPLE 26

Using a procedure analogous to that described in Example 22, 1-n-hexyl-1,2,3,6-tetrahydro-4-pyridylmethyl benzilate and its hydrochloride, m.p. 146°–148°C, were prepared from 1-n-hexyl-1,2,3,6-tetrahydro-4-pyridyl-carbinol and methyl benzilate.

EXAMPLE 27

Using a procedure analogous to that described in Example 22, 1-allyl-1,2,3,6-tetrahydro-4-pyridylmethyl benzilate and its hydrochloride, m.p. 132°–134°C (recrystallized from acetone/ether), of the formula

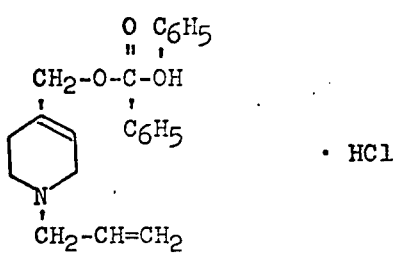

were prepared from 1-allyl-1,2,3,6-tetrahydro-4-pyridyl-carbinol and methyl benzilate.

EXAMPLE 28

Using a procedure analogous to that described in Example 22, 1-(β-phenethyl)-1,2,3,6-tetrahydro-4-pyridylmethyl benzilate and its methanesulfonate, m.p. 155°–156°C (recrystallized from acetonitrile), of the formula

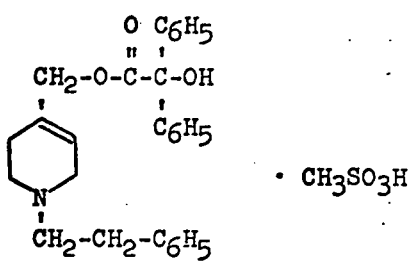

were prepared from 1-(β-phenethyl)1,2,3,6-tetrahydro-4-pyridyl-carbinol and methyl benzilate.

EXAMPLE 29

Using a procedure analogous to that described in Example 22, 1-ethyl-1,2,3,6-tetrahydro-4-pyridylmethyl hexahydrobenzilate and its hydrochloride, m.p. 168°–170°C (recrystallized from acetone/ethylacetate), of the formula

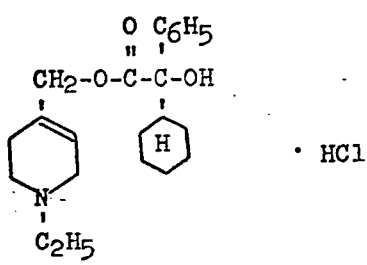

were prepared from 1-ethyl-1,2,3,6-tetrahydro-4-pyridylcarbinol and methyl hexahydrobenzilate.

EXAMPLE 30

1,2,3,6-Tetrahydro-4-pyridylmethyl α-phenyl-cyclopentylacetate hydrochloride

A solution of 15.65 gm (0.05 mol) of 1-methyl-1,2,3,6-tetrahydro-4-pyridylmethyl α-phenyl-cyclopentylacetate in 40 ml of absolute toluene was slowly admixed at room temperature with a solution of 5.25 gm (0.053 mol) of phosgene in 35 ml of absolute toluene, and the mixed solution was allowed to stand at room temperature for 43 hours. Thereafter, the toluene was distilled off at 60°C in vacuo, the residue was taken up in ether, and the insoluble matter was filtered off. The ethereal filtrate was washed first with 2 N hydrochloric acid and then with water, dried over anhydrous sodium sulfate, and evaporated in vacuo, leaving as a residue 14.65 gm (81% of theory) of oily 1-chlorocarbonyl-1,2,3,6-tetrahydro-4-pyridylmethyl α-phenyl-cyclopentylacetate. This compound was hydrolized by heating it with 70 ml of water, whereby carbon dioxide was evolved; as soon as all of the oil had gone completely into solution, the hot aqueous solution was filtered through charcoal, and the filtrate was evaporated to dryness in vacuo. The residue was recrystallized several times from acetonitrile in the presence of activated charcoal, yielding 7.1 gm (42.2% of theory) of the compound of the formula

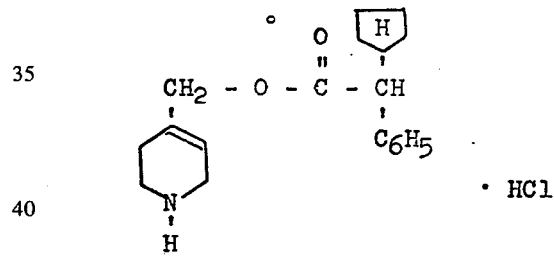

having a melting point of 162-164°C

EXAMPLE 31

1-(β-Hydroxy-ethyl)-1,2,3,6-tetrahydro-4-pyridylmethyl α-phenyl-cyclopentylacetate hydrochloride by method C A mixture consisting of 8.1 gm (0.024 mol) of 1,2,3,6-tetrahydro-4-pyridylmethyl α-phenylcyclopentylacetate hydrochloride, 3.37 gm (0.03 mol) of bromoethanol, 5.3 gm (0.05 mol) of sodium carbonate and 70 ml of absolute acetonitrile was refluxed for 3 hours while stirring. Thereafter, the organic salts which had precipitated were filtered off, the acetonitrile was distilled out of the filtrate, and the residue was dissolved in methylene chloride. The resulting solution was shaken with aqueous sodium carbonate, the aqueous phase was separated and extracted with methylene chloride, and the organic phases were combined, dried over sodium sulfate and concentrated by evaporation. Ethereal hydrochloric acid was added to the concentrated methylene chloride solution, and the crystalline precipitate formed thereby was collected by vacuum filtration and repeatedly recrystallized from acetone/ether until it had a constant melting point. 6.4 gm (69.9% of theory) of the compound, m.p. 124°-124.5°C, of the formula

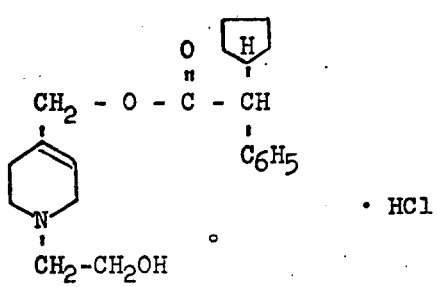

were obtained.

EXAMPLE 32

Using a procedure analogous to that described in Example 31, 1-isobutyl-1,2,3,6-tetrahydro-4-pyridylmethyl α-phenyl-cyclopentylacetate hydrochloride, m.p. 171°-174°C (recrystallized from acetonitrile/ether), of the formula

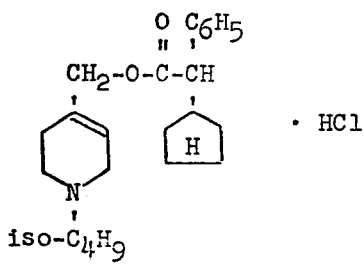

was prepared from 1,2,3,6-tetrahydro-4-pyridylmethyl α-phenyl-cyclopentylacetate hydrochloride and isobutyl bromide.

EXAMPLE 33

Using a procedure analogous to that described in Example 31, 1-propargyl-1,2,3,6-tetrahydro-4-pyridylmethyl α-phenyl-cyclopentylacetate citrate, m.p. 113°-115°C (recrystallized from acetone/ether), of the formula

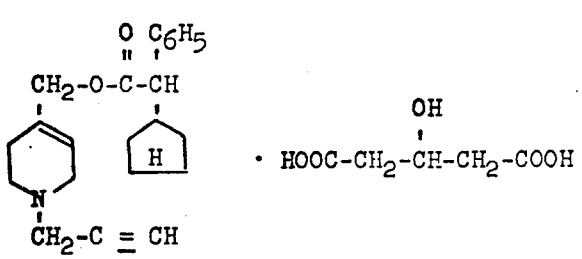

was prepared from 1,2,3,6-tetrahydro-4-pyridylmethyl α-phenyl-cyclopentylacetate hydrochloride and propargyl bromide.

EXAMPLE 34

Using a procedure analogous to that described in Example 31, 1-(β-cyano-ethyl)-1,2,3,6-tetrahydro-4-pyridylmethyl α-phenyl-cyclopentylacetate hydrochloride, m.p. 154°-156°C (recrystallized from acetone/ether), of the formula

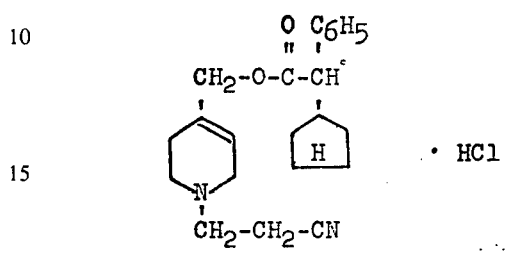

was prepared from 1,2,3,6-tetrahydro-4-pyridylmethyl α-phenyl-cyclopentylacetate hydrochloride and β-cyanoethyl chloride.

EXAMPLE 35

Using a procedure analogous to that described in Example 31, 1-benzyl-1,2,3,6-tetrahydro-4-pyridylmethyl α-phenyl-cyclopentylacetate hydrochloride, m.p. 185°-187°C (recrystallized from acetonitrile), of the formula

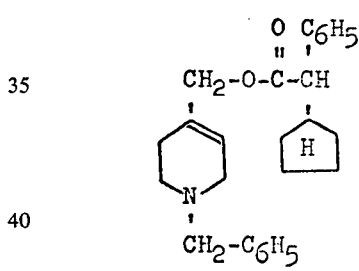

was prepared from 1,2,3,6-tetrahydro-4-pyridylmethyl α-phenyl cyclopentylacetate and benzyl bromide.

EXAMPLE 36

1-Ethyl-1,2,3,6-tetrahydro-4-pyridylmethyl α-phenyl-cyclohexylacetate hydrochloride

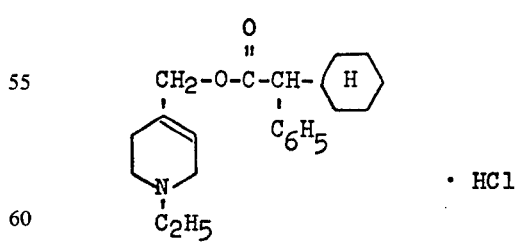

The title compound was prepared using a procedure analogous to that described in Example 4, from 1-ethyl-1,2,3,6-tetrahydro-4-pyridylcarbinol hydrochloride and phenyl-cyclohexylacetic acid chloride. M.p. 168°-170°. Methobromide: m.p. 202°-204°C.

EXAMPLE 37

1-Methyl-1,2,3,6-tetrahydro-4-pyridylmethyl α-phenyl-β-methyl-valeric acid ester citrate

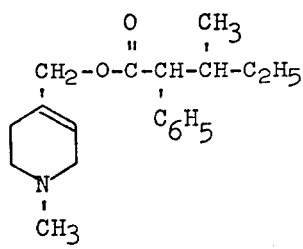

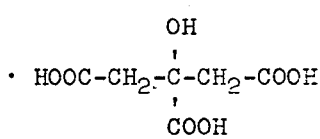

The title compound was prepared using a procedure analogous to that described in Example 4, from 1-methyl-1,2,3,6-tetrahydro-4-pyridylcarbinol hydrochloride and 2-phenyl-β-methylvaleric acid chloride. M.p. 142°–144°.

EXAMPLE 38

1-Methyl-1,2,3,6-tetrahydro-4-pyridylmethyl-benzilate hydrochloride

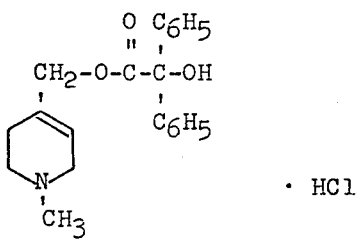

The title compound was prepared using a procedure analogous to that described in Example 22, from 1-methyl-1,2,3,6-tetrahydro-4 -pyridyl-carbinol and benzilic acid methyl ester. M.p. 174°–175°. Methobromide: m.p. 224°–228°C.

EXAMPLE 39

1-(β-Chloro-ethyl)-1,2,3,6-tetrahydro-4-pyridylmethyl α-phenyl-cyclopentylacetate hydrochloride by method D 3 gm (0.079 mol) of 1-(β-hydroxy-ethyl)-1,2,3,6-tetrahydro-4-pyridylmethyl α-phenyl-cyclopentylacetate hydrochloride were dissolved in 20 ml of thionyl chloride, and the solution was refluxed for 2 ½ hours. Thereafter, the excess thionyl chloride was distilled off in vacuo, and the residue was purified by dissolving it three times in acetone and each time distilling off the solvent in vacuo. The crystalline product thus obtained was dissolved in hot acetone, reprecipitated therefrom by addition of ether, collected by vacuum filtration, and repeatedly recrystallized from acetone/ether until it had a constant melting point. 2.1 gm (66.8% of theory) of the compound, m.p. 145°–146°C, of the formula

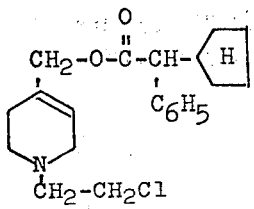

were obtained.

EXAMPLE 40

Separation of racemic 1,2,3,6-tetrahydro-4-pyridylmethyl α-phenyl-cyclopentylacetate into optically active antipodes 76 gm (0.25 mol) of racemic 1,2,3,6-tetrahydro-4-pyridylmethyl α-phenyl-cyclopentylacetate and 38.2 gm (0.25 mol) of L(+)-tartaric acid were dissolved in 400 ml of hot ethanol, and the solution was allowed to cool. The crystalline precipitate formed thereby was collected and recrystallized first twice from a mixture of equal parts of methanol and ethanol and then repeatedly from pure methanol until it had a constant melting point and specific rotation. 36.7 gm of the tartrate of the dextro-rotatory base, m.p. 160–162°C, $[\alpha]_D^{25} = +28°$ ($c + 5$; dimethylsulfoxide), were obtained.

In like manner, the tartrate of the levo-rotatory base was obtained from the mother liquor of the above precipitation procedure with the aid of D(−)-tartaric acid. Upon recrystallization from methanol until constant melting point and specific rotation, 24 gm of the tartrate, m.p. 160°–162°C, $[\alpha]_D^{25} = -28°$ ($c = 5$; dimethylsulfoxide), were obtained.

The optically active bases were liberated from the respective tartrates with concentrated ammonia, and converted into the hydrochlorides in conventional fashion, yielding a.     (+)-1,2,3,6-tetrahydro-4-pyridylmethyl α-phenyl-cyclopentylacetate hydrochloride, m.p. 121.5° –123.5°C (from acetone/ether), $[\alpha]_D^{25} = +30.5°$ ($c = 5$; ethanol), and b.     (−)-1,2,3,6-tetrahydro-4-pyridylmethyl α-phenyl-cyclopentylacetate hydrochloride, m.p. 120°–122°C (from acetone/ether), $[\alpha]_D^{25} = -+°$ ($c = 5$; ethanol).

EXAMPLE 41

(+)- and (−)-1-Methyl-1,2,3,6-tetrahydro-4-pyridylmethyl α-phenyl-cyclopentylacetate methanesulfonate from optically active starting compounds by method C A mixture consisting of 6 gm (0.02 mol) of (+)-1,2,3,6-tetrahydro-4-pyridylmethyl α-phenyl-cyclopentylacetate, 2.5 gm (0.054 mol) of formic acid and 0.8 gm of paraformaldehyde was heated for 30 minutes on a boiling water bath. Thereafter, the reaction mixture was allowed to cool, made alkaline with concentrated ammonia, and extracted with ether. The ethereal extract was dried over anhydrous sodium sulfate and then evaporated, leaving as a residue 6.4 gm (85% of theory) of (+)-1-methyl-1,2,3,6-tetrahydro-4-pyridylmethyl α-phenyl-cyclopentylacetate, whose methanesulfonate had a melting point of 139-141°C (from acetone) and a specific rotation $[\alpha]_D^{27} = +25°$ ($c = 5$; ethanol).

In analogous fashion, (−)-1-methyl-1,2,3,6-tetrahydro-4-pyridylmethyl α-phenyl-cyclopentylacetate and its methanesulfonate were obtained from the levo-rotatory norbase.

The compounds embraced by formula I above, their non-toxic, pharmacologically acceptable acid addition salts, and their quaternary pyridinium salts, have useful pharmacodynamic properties. More particularly, they exhibit anticholinergic activities in warm-blooded animals, such as dogs, rats and mice.

In comparison to the classic spasmolytic, atropine, the spasmolytic (anticholinergic) activity of the compounds of the instant invention is several times stronger, whereas undesirable side effects, such as mydriasis, tachicardia and inhibition of saliva secretion, become discernable only at dosage levels corresponding to several multiples of the therapeutic dose.

Among the tertiary pyridyl compounds represented by formula I, those wherein $R_1$ is alkyl of one to three carbon atoms exhibit an extraordinarily favorable therapeutic ratio between the principal anticholineric activity and undersirable side effects. Quaternization of these tertiary compounds with an alkyl group, particularly with a methyl group, further intensifies this therapeutic activity several-fold, while the intensity of the undesirable side effects is, for practical purposes, not intensified.

Especially favorable properties are exhibited by those esters of the formula I wherein the carboxylate moiety is derived from benzilic acid or α-phenyl-cycloalkylacetic acid.

For pharmaceutical purposes the compounds of the formula I or their acid addition or quaternary salts are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds is from 0.0083 to 0.84 mgm/kg body weight, preferably 0.0166 to 0.33 mgm/kg body weight.

The following examples illustrate a few pharmaceutical dosage unit compositions comprising a compound of the formula I or an acid addition or quaternary salt thereof as an active ingredient and represent the best modes contemplated of putting the invention into practical use. The parts are parts by weight unless otherwise specified.

EXAMPLE 42

Coated pills

The pill core composition is compounded from the following ingredients:

| | | |
|---|---:|---|
| 1-Methyl-1,2,3,6-tetrahydro-4-pyridyl-methyl α-phenyl-cyclopentylacetate methanesulfonate | 10.0 | parts |
| Lactose | 57.0 | " |
| Corn starch | 30.0 | " |
| Gelatin | 2.0 | " |
| Magnesium stearate | 1.0 | " |
| Total | 100.0 | parts |

Preparation:

The pyridylmethyl carboxylate salt is intimately admixed with the lactose and the corn starch, the mixture is moistened with an aqueous 10% solution of the gelatin, the moist mass is forced through a 1 mm-mesh screen, the resulting granulate is dried at 40°C and again passed through the screen, the dry granulate is admixed with the magnesium stearate, and the composition is compressed into 100 mgmpill cores which are subsequently coated with a thin shell consisting essentially of a mixture of sugar, titanium dioxide, talcum and gum arabic, and finally polished with beeswax. Each coated pill contains 10 mgm of the pyridylmethyl carboxylate salt and is an oral dosage unit composition with effective anticholinergic action.

EXAMPLE 43

Tablets

The tablet composition is compounded from the following ingredients:

| | | |
|---|---:|---|
| 1-Methyl-1,2,3,6-tetrahydro-4-pyridyl-methyl α-phenyl-cyclopentylacetate methanesulfonate | 6 | parts |
| Lactose | 100 | " |
| Corn starch | 64 | " |
| Soluble starch | 8 | " |
| Magnesium stearate | 2 | " |
| Total | 180 | parts |

Preparation:

The pyridylmethyl carboxylate salt is intimately admixed with the magnesium stearate, the mixture is moistened with an aqueous solution of the soluble starch, the moist mass is forced through a fine-mesh screen, the resulting granulate is dried and intimately admixed with the lactose and the corn starch, and the composition is compressed into 180 mgm-tablets. Each tablet contains 6 mgm of the pyridylmethyl carboxylate salt and is an oral dosage unit composition with effective anticholinergic action.

EXAMPLE 44

Suppositories

The suppository composition is compounded from the following ingredients:

| | | |
|---|---:|---|
| 1-Methyl-1,2,3,6-tetrahydro-4-pyridyl-methyl α-phenyl-cyclohexylacetate methobromide | 30 | parts |
| Suppository base (e.g. cocoa butter) | 1670 | " |
| Total | 1700 | parts |

Preparation:

The finely pulverized quaternary salt is uniformly blended with the aid of an immersion homogenizer into the suppository base which has previously been melted and cooled to 40°C, and 1700 mgm portions of the resulting composition are poured at 35°C into cooled suppository molds. Each suppository contains 30 mgm of the active ingredient and is a rectal dosage unit composition with effective spasmolytic action.

EXAMPLE 45

Hypodermic solution

The solution is compounded from the following ingredients:

| | | | |
|---|---|---:|---|
| 1-Ethyl-1,2,3,6-tetrahydro-4-pyridyl-methyl benzilate . HCl | | 1.0 | parts |
| Sodium chloride | | 18.0 | " |
| Distilled water | q.s.ad | 2000.0 | " |
| | | | by vol. |

Preparation:

The active ingredient and the sodium chloride are dissolved in the boiled, double distilled water, the solution is filtered until free from suspended particles, and the filtrate is filled under aseptic conditions into 2 cc-ampules, which are subsequently sealed and sterilized for 20 minutes at 120°C. Each ampule contains 1 mgm of the pyridylmethyl benzilate salt, and its contents are an injectable dosage unit composition with effective spasmolytic action.

Analogous results are obtained when any one of the other compounds of the formula I or a non-toxic acid addition or quaternary salt thereof is substituted for the particular active ingredient in Examples 42 through 45. Likewise, the amount of active ingredient in the illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. An anticholinergic pharmaceutical composition consisting essentially of an inert pharmaceutical carrier and an effective anticholinergic amount of a racemic mixture of a compound of the formula

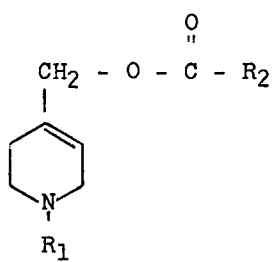

wherein $R_1$ is hydrogen, alkyl of one to eight carbon atoms, chloro-(alkyl of one to two carbon atoms), cyano(alkyl of one to two carbon atoms), hydroxy-(alkyl of one to two carbon atoms), phenyl-(alkyl of one to two carbon atoms), alkenyl of three to four carbon atoms or alkynyl, of three to four carbon atoms,

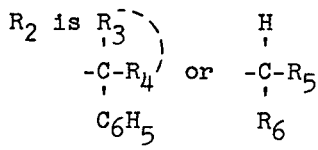

where $R_3$ is hydroxyl or, together with $R_4$ and the carbon atom to which they are attached, a five- to six-membered saturated carbocyclic ring, $R_4$ and $R_5$ are each alkyl of one to four carbon atoms, cycloalkyl of five to six carbon atoms or phenyl, and $R_6$ is cycloalkyl of five to six carbon atoms or phenyl, an optically active antipode component thereof, a methyl halide, methyl sulfate or methyl methanesulfonate quaternary tetrahydropyridinium salt thereof, or a non-toxic acid addition salt of said racemate or optically active antipode component.

2. A composition of claim 1, wherein said compound is racemic or optically active 1-methyl-1,2,3,6-tetrahydro-4-pyridylmethyl α-phenyl-cyclopentylacetate, a non-toxic pharmacologically acceptable acid addition salt thereof, or methobromide quaternary salt thereof.

3. A composition of claim 1, wherein said compound is racemic or optically active 1-methyl-1,2,3,6-tetrahydro-4-pyridylmethyl α-phenyl cyclohexylacetate, a non-toxic, pharmacologically acceptable acid addition salt thereof, or the methobromide quaternary salt thereof.

4. A composition of claim 1, wherein said compound is racemic or optically active 1-ethyl-1,2,3,6-tetrahydro-4-pyridylmethyl benzilate, a non-toxic, pharmacologically acceptable acid addition salt thereof, or the methobromide quaternary salt thereof.

5. The method of blocking the passage of impulses through the parasympathetic nerves in a warm-blooded animal in need of such treatment, which comprises perorally, parenterally or rectally administering to said animal an effective effective anticholinergic amount of a racemic mixture of a compound of formula

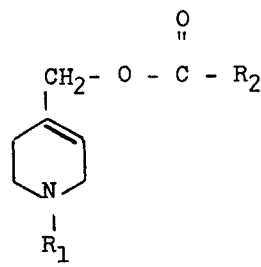

wherein $R_1$ is hydrogen, alkyl of one to eight carbon atoms, chloro (alkyl of one to two carbon atoms), cyano(alkyl of one to two carbon atoms), hydroxy-(alkyl of one to two carbon atoms), phenyl-(alkyl of one to two carbon atoms), alkenyl to three to four carbon atoms or alkynyl of three to four carbon atoms, and

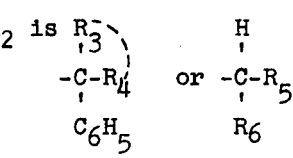

where $R_3$ is hydroxyl or, together with $R_4$ and the carbon atom to which they are attached, a five- to six-membered saturated carbocyclic ring, $R_4$ and $R_5$ are each alkyl of one to four carbon atoms, cycloalkyl of five to six carbon atoms or phenyl, and $R_6$ is cycloalkyl of five to six carbon atoms or phenyl, an optically active antipode component thereof, a methyl halide, methyl sulfate or methyl methanesulfonate quaternary tetrahydropyridinium salt thereof, or a non-toxic acid addition salt of said racemate or optically active antipode component.

6. The method of claim 5, wherein said compound is racemic or optically active 1-methyl-1,2,3,6-tetrahydro-4-pyridylmethyl α-phenyl-cyclopentylacetate, non-toxic, pharmaceutically acceptable acid addition salt thereof, or the methobromide quaternary salt thereof.

7. The method of claim 5, wherein said compound is racemic or optically active 1-methyl-1,2,3,6-tetrahydro-4-pyridylmethyl α-phenyl cyclohexylacetate, a non-toxic, pharmacologically acceptable acid addition salt thereof, or the methobromide quaternary salt thereof.

8. The method of claim 5, wherein said compound is racemic or optically active 1-ethyl-1,2,3,6-tetrahydro-4-pyridylmethyl benzilate, a non-toxic, pharmacologically acceptable acid addition salt thereof, or the methobromide quaternary salt thereof.

* * * * *

PO-1050
(5/69)

UNITED STATES PATENT OFFICE
CERTIFICATE OF CORRECTION

Patent No. 3,879,556  Dated  April 22, 1975

Inventor(s) GERHARD WALTHER et al

It is certified that error appears in the above-identified patent and that said Letters Patent are hereby corrected as shown below:

In Col. 15, line 48 "11,2,3,6-" should read -- 1,2,3,6- --

In Col. 20, line 42 "-4°" should read -- -30° --

In Col. 21, line 15 "anticholineric" should read -- anticholinergic

In Col. 21, line 39 "alkenyl to" should read -- alkenyl of --

Signed and Sealed this twenty-second Day of July 1975

[SEAL]

Attest:

RUTH C. MASON
Attesting Officer

C. MARSHALL DANN
Commissioner of Patents and Trademarks